US010887657B2

(12) United States Patent
Chen et al.

(10) Patent No.: US 10,887,657 B2
(45) Date of Patent: Jan. 5, 2021

(54) MESSAGE TRANSMISSION METHOD, DEVICE AND STORAGE MEDIUM FOR MEDIA FILES

(71) Applicant: TENCENT TECHNOLOGY (SHENZHEN) COMPANY LIMITED, Guangdong (CN)

(72) Inventors: Xiaomin Chen, Shenzhen (CN); Bing Li, Shenzhen (CN); Changwen Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 137 days.

(21) Appl. No.: 16/213,405

(22) Filed: Dec. 7, 2018

(65) Prior Publication Data
US 2019/0110105 A1 Apr. 11, 2019

Related U.S. Application Data

(63) Continuation of application No. PCT/CN2017/100874, filed on Sep. 7, 2017.

(30) Foreign Application Priority Data

Sep. 12, 2016 (CN) .......................... 2016 1 0817524

(51) Int. Cl.
G06F 15/16 (2006.01)
H04N 21/4788 (2011.01)
(Continued)

(52) U.S. Cl.
CPC ....... *H04N 21/4788* (2013.01); *H04L 51/046* (2013.01); *H04L 51/10* (2013.01); *H04N 21/4627* (2013.01); *H04L 51/28* (2013.01)

(58) Field of Classification Search
CPC .......... H04N 21/4788; H04N 21/4627; H04N 21/25875; H04N 21/47217; H04N 21/4882; H04L 51/046; H04L 51/10; H04L 51/28
See application file for complete search history.

(56) References Cited

U.S. PATENT DOCUMENTS 7,996,566 B1 * 8/2011 Sylvain ..................... H04N 7/15
709/202
2014/0331289 A1 * 11/2014 Li .......................... H04L 65/403
726/4
(Continued)

FOREIGN PATENT DOCUMENTS

CA 2 338 488 A1 3/2000
CN 102378057 A 3/2012
(Continued)

OTHER PUBLICATIONS

China Office Action for Application No. 201610817524.9 dated Jul. 3, 2018.
(Continued)

*Primary Examiner* — John B Walsh
(74) *Attorney, Agent, or Firm* — Sughrue Mion, PLLC

(57) ABSTRACT

A message transmission method is provided. A processor that implements a first client, corresponding to a first account, determines a second account which performs message interaction with the first account, the second account corresponding to a second client. The first client transmits to the second client a preset link that is usable for playing a target media file at the second client, the target media file being currently played at the first client. The first client transmits and receives a message between the first account and the second account based on the target media file being
(Continued)

played at the first client and the second client, the message being displayed on a first preset page of the first client.

20 Claims, 10 Drawing Sheets

(51) Int. Cl.
*H04N 21/4627* (2011.01)
*H04L 12/58* (2006.01)

(56) References Cited

U.S. PATENT DOCUMENTS

| | | | | |
|---|---|---|---|---|
| 2015/0215497 | A1* | 7/2015 | Zhang | H04N 21/4347 348/521 |
| 2015/0227290 | A1* | 8/2015 | Lewis | H04L 67/36 715/716 |
| 2017/0070456 | A1* | 3/2017 | Norhammar | H04L 65/601 |

FOREIGN PATENT DOCUMENTS

| | | |
|---|---|---|
| CN | 104661057 A | 5/2015 |
| CN | 104869467 A | 8/2015 |
| CN | 104980809 A | 10/2015 |
| CN | 105847988 A | 8/2016 |
| CN | 106385603 A | 2/2017 |
| WO | 2016/115945 A1 | 7/2016 |

OTHER PUBLICATIONS

China Office Action for Application No. 201610817524.9 dated Sep. 25, 2018.
International Search Report for PCT/CN2017/100874 dated Oct. 31, 2017 [PCT/ISA/210].
Communication dated Dec. 20, 2018, from State Intellectual Property Office of the P.R.C. In counterpart application No. 201610817524. 9.
Written Opinion of PCT/CN2017/100874 dated Oct. 31, 2017.

* cited by examiner

MESSAGE TRANSMISSION METHOD, DEVICE AND STORAGE MEDIUM FOR MEDIA FILES

CROSS-REFERENCE TO RELATED APPLICATIONS

This application is a continuation of International Application, PCT/CN2017/100874, filed on Sep. 7, 2017, in the Chinese Patent Office, which claims priority from Chinese Patent Application No. 201610817524.9, entitled "MESSAGE TRANSMISSION METHOD AND APPARATUS FOR MEDIA FILE" filed in the Chinese Patent Office on Sep. 12, 2016, the disclosures of which are incorporated herein by reference in their entireties.

BACKGROUND

1. Field

Apparatuses and methods consistent with exemplary embodiments relate to the field of computers, and specifically, to a message transmission method and apparatus for a media file, and a storage medium.

2. Description of the Related Art

A barrage message issued by a user by means of an account may be associated with played content of a media file corresponding to a time point at which the barrage message is issued. When playing content at a certain time point by means of an account, a user is able to see barrage messages issued by others at the same certain time point. However, only a user of an account corresponding to a media file at a relatively slow playing progress is able to see a message issued by a user of an account corresponding to the media file at a relatively fast playing progress, and reply to and comment the message issued by the user of the account corresponding to the media file at a relatively fast playing progress. In the case of the user of the account corresponding to the media file at a relatively fast playing progress, the message issued by the user of the account corresponding to the media file at a relatively slow playing progress may be skipped.

Therefore, the message transmission method of the barrage technology only allows an account corresponding to a media file at a relatively slow playing progress to unidirectionally issue a message, and an account corresponding to a media file at a relatively fast playing progress and an account corresponding to the media file at a relatively slow playing progress are not able to perform bidirectional message interaction, resulting in that message interaction cannot be performed in real time during a process of playing a media file.

The related art message transmission method cannot provide a resolution with regard to the problem that message interaction cannot be performed in a process of playing a media file.

SUMMARY

One or more exemplary embodiments provide a message transmission method and apparatus for a media file, and a storage medium, so as to at least resolve the technical problem that message interaction cannot be performed in a process of playing a media file in the related technology.

According to an aspect of an exemplary embodiment, a message transmission method is provided. A processor that implements a first client, corresponding to a first account, determines a second account which performs message interaction with the first account, the second account corresponding to a second client. The first client transmits to the second client a preset link that is usable for playing a target media file at the second client, the target media file being currently played at the first client. The first client transmits and receives a message between the first account and the second account based on the target media file being played at the first client and the second client, the message being displayed on a first preset page of the first client.

According to an aspect of another exemplary embodiment, a message transmission apparatus is provided. The apparatus includes at least one memory configured to store computer program code; and at least one processor configured to access the at least one memory and operate according to the computer program code. The computer program code including first determining code; first transmitting code; and first interaction code. The first determining code causes the at least one processor to enable a first client, corresponding to a first account, to determine a second account which performs message interaction with the first account, the second account corresponding to a second client. The first transmitting code causes the at least one processor to enable the first client to transmit, to the second client, a preset link that is usable for playing a target media file at the second client, the target media file being currently played at the first client. The first interaction code causes the at least one processor to enable the first client to transmit and receive a message between the first account and the second account based on the target media file being played at the first client and the second client, the message being displayed on a first preset page of the first client.

According to an aspect of still another exemplary embodiment, a non-transitory computer-readable recording medium having recorded thereon a program for executing a message transmission method is provided. In the message transmission method, a first client corresponding to a first account determines a second account which performs message interaction with the first account, the second account corresponding to a second client. The first client transmits to the second client a preset link that is usable for playing a target media file at the second client, the target media file being currently played at the first client. The first client transmits and receives a message between the first account and the second account based on the target media file being played at the first client and the second client, the message being displayed on a first preset page of the first client.

According to exemplary embodiments, by determining, by a first client, a second account which performs message interaction with a first account, sending, by the first client, a preset link to the second client in a process in which the first client plays a target media file, and performing, by the first client and the second client, message interaction between the first account and the second account based on the target media file in a process in which the first client and the second client play the target media file, the purpose of performing message interaction (e.g., real time message interaction) between different accounts by means of clients based on a media file in a playing process of the media file is achieved, the technical effect of performing message interaction in a process of playing a media file is achieved, and further the technical problem that message interaction cannot be performed in a process of playing a media file in the related technology is resolved.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

To help a person skilled in the art better understand the solutions in the disclosure, the following clearly and completely describes the technical solutions in the exemplary embodiments with reference to the accompanying drawings. Accompanying drawings described herein are used to provide further understanding about the exemplary embodiments. The exemplary embodiments and their description are used to explain the disclosure and should not be construed to limit the disclosure. Apparently, the described embodiments are merely some but not all of the embodiments. All other embodiments that can be obtained by a person of ordinary skill in the art based on the disclosure without creative efforts shall fall within the protection scope.

It should be noted that the terms "first" and "second" in the description, the claims, and the accompanying drawings of the disclosure are merely used for distinguishing similar targets, and are not used for describing a specific sequence or order. It should be understood that, data used in this way can be interchanged in an appropriate case, so that the embodiments that are described herein can be implemented in a sequence other than those sequences illustrated or described herein. Moreover, the terms "include", "comprise", and any variants thereof are intended to cover a non-exclusive inclusion. For example, in the context of a process, method, system, product, or device that includes a series of steps or units not only include such steps or units that are specified clearly, but also include other steps or units that are not specified clearly or are inherent to the process, method, product, or device.

An exemplary embodiment provides an exemplary embodiment of a message transmission method for a media file.

Figure 1:
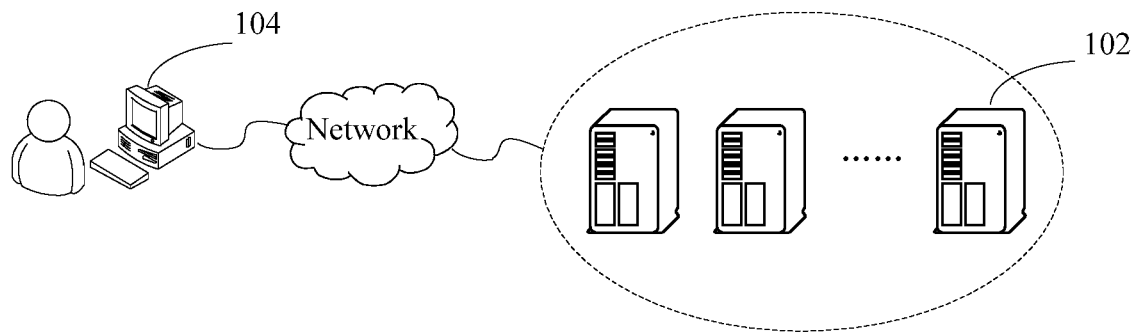
FIG. 1 is a schematic diagram of a hardware environment of a message transmission method for a media file according to an exemplary embodiment.

Optionally, in this embodiment, the message transmission method for a media file may be applied to a hardware environment constructed by a server 102 and a terminal 104 shown in FIG. 1.

FIG. 1 is a schematic diagram of a hardware environment of a message transmission method for a media file according to an exemplary embodiment. As shown in FIG. 1, the server 102 is connected to the terminal 104 through a network. The network includes, for example but is not limited to: a wide area network, a metropolitan area network, or a local area network. The terminal 104 may include, for example but not limited to, a PC, a mobile phone, a tablet computer, or the like. The message transmission method for a media file according to an exemplary embodiment may be performed by the server 102, or may also be performed by the terminal 104, or may also be performed by the server 102 and the terminal 104 together. The message transmission method for a media file according to an exemplary embodiment performed by the terminal may also be performed by a client installed in the terminal 104. For example, the client may be implemented by a processor of the terminal 104.

Figure 2:
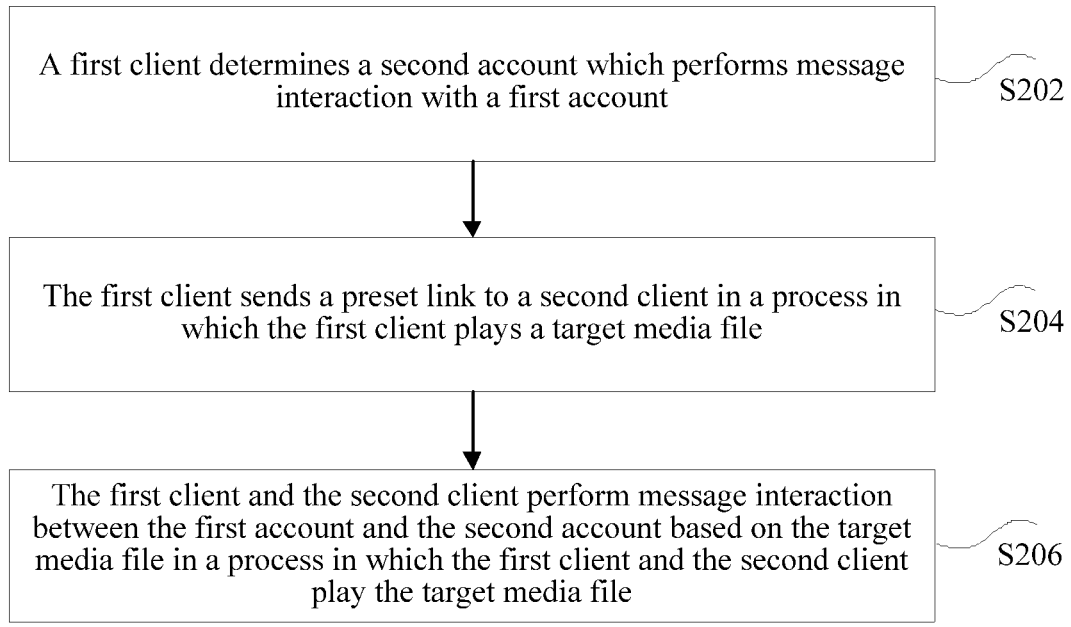
FIG. 2 is a flow chart of a message transmission method for a media file according to an exemplary embodiment.

FIG. 2 is a flow chart of a message transmission method for a media file according to an exemplary embodiment.

As shown in FIG. 2, the message transmission method for a media file may include the following steps:

Step S202: A first client determines a second account which performs message interaction with a first account.

In the technical solution provided in step S202, the first client is configured to play a media file. A media file selected by a first target user may be played in a situation in which the first account succeeds in logging in the first client, where the first account is used for marking the first target user playing (e.g., viewing or listening to) the media file. The first client determines a second account which performs message interaction with the first account. The second account is used for marking a second target user playing the media file. The first client may create, by means of the first account, a page for message interaction, for example, a message interaction page in a chat room, and select, by means of the message interaction page, an account for performing message interaction with the first account, so as to determine the second account. The second account may be one account. In this case, the first account performs one-to-one bidirectional message interaction with the determined second account by means of the first client. The second account may also be a plurality of accounts. In this case, the first account performs group message interaction with the determined plurality of accounts by means of the first client. Message interaction between the first target user and the second target user may be implemented through message interaction between the first account and the second account, so as to avoid return of messages issued by all users corresponding to the playing progress of the media file back to the client when playing the media file, and avoid the problem that the first target user's experience of playing the media file can be affected due to excessively huge information volume transmitted to the first client.

Step S204: The first client sends a preset link to a second client in a process in which the first client plays a target media file.

In the technical solution provided in step S204, after the first client determines the second account which performs message interaction with the first account, if the first target user corresponding to the first account wants to share the target media file being currently viewed to the second target user corresponding to the second account in the process in which the first client plays the media file, the first client sends the preset link to the second client. The preset link is a link for playing the target media file, or may be a storage address of the target media file on a server. The second client receives the preset link and plays the target media file according to the preset link, so as to enable the second target user corresponding to the second account to play a media file the same as that of the first target user corresponding to the first account.

Step S206: The first client and the second client perform message interaction between the first account and the second account based on the target media file in a process in which the first client and the second client play the target media file.

In the technical solution provided in step S206, the first target user corresponding to the first account and the second target user corresponding to the second account may view or listen to the same target media file in the process in which the first client and the second client play the target media file. The second account may receive in real time a message sent by the first account by means of the second client.

Optionally, the progresses of playing the target media file by the first client and the second client are different. For example, if the progress of playing the target media file by the first client is faster than the progress of playing the target media file by the second client, the first account sends a message to the second account by means of the first client based on played content corresponding to the playing progress of the target media file. The message enables the second target user corresponding to the second account to learn in advance about or guess content of the target media file to be played on the second client, for example, the message may provide episode related information to the second target user, so as to induce further reply to the message from the second target user.

It should be noted that the type of the media file released by the server is not specifically limited in the embodiment. The media file released by the server may be a video file, an audio file, a picture file, a text file, or the like, or may also be any combination of several files, for example, a combination of a text file and a picture file, or a combination of a video file and a text file. The specific product form may be, for example, a video advertisement, a native advertisement, a search advertisement, or the like. For example, the target media file of the embodiment is a video file.

As an optional implementation, in step S202, the determining, by a first client, a second account which performs message interaction with a first account includes: sending, by the first client, an invitation request so as to request the second account to perform message interaction by means of the second client with the first account by means of the first client.

The first client sends the invitation request. The invitation request is used for requesting the second account to perform message interaction by means of the second client with the first account by means of the first client. The first client creates the message interaction page by means of the first account in the process of playing the media file. At this time, only the first account exists in the message page, and a message sent by the first account can be seen by the first target user corresponding to the first account only. After the second client receives the invitation request, the second client responds to the invitation request, to obtain a response result. The first client determines the second account according to the response result sent by the second client in response to the invitation request. After the first client sends the invitation request, the first client receives the response result sent by the second client in response to the invitation request. The response result may be a result that the second account agrees to perform message interaction by means of the second client with the first account by means of the first client. The first client determines the second account according to the response result.

As an optional implementation, after the first client determines the second account which performs message interaction with the first account, the first client determines a third account which performs message interaction with the first account and the second account; after the first client sends the preset link to the second client, the method further includes: sending, by the first client, the preset link to a third client, where the third client plays the target media file according to the preset link and the third account performs message interaction by means of the third client; and performing, by the first client, the second client, and the third client, message interaction between the first account, the second account, and the third account based on the target media file, where a message among the first account, the second account, and the third account is displayed on preset pages of the first client, the second client, and the third client.

After the first client sends the preset link to the third client, the third account may also perform message interaction with the first account and the second account by means of the third client after determining the third account which performs message interaction with the first account and the second account. Messages among the first account, the second account, and the third account are all displayed on the preset pages of the first client, the second client, and the third client. The first target user corresponding to the first account, the second target user corresponding to the second account, and the third target user corresponding to the third account may see the messages issued by the other parties by means of the corresponding clients, so as to achieve the technical effect of performing message interaction in a process of playing a media file.

It should be noted that the first account, the second account, and the third account in the embodiment may be accounts in a chat group, the chat group may include other accounts apart from the first account, the second account, and the third account, and clients of the other accounts, the first client, the second client, and the third client may perform message interaction among the other accounts, the first account, the second account, and the third account based on the target media file, so as to achieve the technical effect of performing message interaction in a process of playing a media file.

As an optional implementation, after the first client, the second client, and the third client performs message interaction among the first account, the second account, and the third account based on the target media file, the first client determines a dismissed account from the second account and the third account, so as to log out an account which performs message interaction with the first account.

After the first client, the second client, and the third client performs message interaction among the first account, the second account, and the third account based on the target media file, the first client determines one or more dismissed accounts from the second account and the third account and determines an account which performs message interaction with the first account, apart from the dismissed account, as a fourth account. The dismissed account is an account which stops message interaction (e.g., exits a chat room) with the first account. For example, any account of the second account and the third account is determined as the dismissed account, or both the second account and the third account are determined as the dismissed accounts. The first client and a client corresponding to the fourth account perform message interaction between the first account and the fourth account based on the target media file.

Optionally, when the first client determines one or more dismissed accounts from the second account and the third account, prompt information used for instructing to exit message interaction with the first account is displayed, and prompt information of whether to confirm dismissing is displayed, for example, prompt information of "After dismissing the chat group, all guests in the group will leave" is displayed, or prompt information such as "Determine later" and "Still dismiss" is displayed, for further selection by a user.

As an optional implementation, after the first client and the second client performs message interaction between the first account and the second account based on the target media file, the first client stops message interaction between the first account and the second account.

The first client acquires first instruction information (or an instruction). The first instruction information is used for instructing to stop message interaction between the first account and the second account. The first account performs message interaction by means of the first client with the second account by means of the second client. Message interaction between the first account and the second account is stopped in the process in which the first account performs message interaction by means of the first client with the second account by means of the second client. For example, the client corresponding to the first account wants to quietly view the target media file without interference by any information. At this time, acquiring the first instruction information for stopping message interaction between the first account and the second account by the first client may be receiving, by means of a preset position on the preset page of message interaction, a single-click touch signal or a double-click touch signal used for instructing to stop message interaction between the first account and the second account, which is not limited herein. After the first client acquires the first instruction information, the first client responds to the first instruction information and stops message interaction between the first account and the second account according to the first instruction information. After the message interaction is stopped, the first account and the second account may not receive any message from each other.

As an optional implementation, after the first client enables, according to the first instruction information, the second account to exit message interaction with the first account, message interaction between the first account and the second account is again performed.

After the first client enables, according to the first instruction information, the second account to exit message interaction with the first account, the first account again performs message interaction by means of the first client with the second account by means of the second client. For example, after stopping message interaction between the first account and the second account, if the first target user corresponding to the first account wants to share played content of the target media file with the second target user corresponding to the second account in the process of viewing the target media file, the first client acquires second instruction information (or a second instruction) used for instructing to again perform message interaction between the first account and the second account. Optionally, a preset position on the preset page of message interaction receives a single-click touch signal or a double-click touch signal used for instructing to again perform message interaction between the first account and the second account, which is not limited herein.

The first client again performs message interaction between the first account and the second account with the second client based on the target media file according to the second instruction information. Optionally, after the first client acquires the second instruction information, if merely message interaction between the first account and the second account is stopped and the message interaction page is not turned off, a touch signal may be received by means of a preset mark button on a main interface of the first client, to again perform message interaction between the first account and the second account.

As an optional implementation, before the first client sends the preset link to the second client, the first client plays the target media file by acquiring a playing authority of playing the target media file. The first client sends a preset link corresponding to the target media file configured with the playing authority to the second client, to enable the second client to directly play the target media file.

The first client acquires the playing authority of playing the target media file. Optionally, after a fee paid by the first account for the target media file reaches a payment standard, the first client acquires an authority of playing the target media file. The playing authority may also be an authority of playing the target media file when a level of the account reaches a level standard. After the first client acquires the playing authority of playing the target media file, the first client sends a preset link corresponding to the target media file configured with the playing authority to the second client, to enable the second client to directly play the target media file.

As an optional implementation, in step S206, the performing, by the first client and the second client, message interaction between the first account and the second account based on the target media file includes: calculating a difference between a playing progress at which the second client plays the target media file and a playing progress at which the first client plays the target media file; and determining whether the difference satisfies a preset condition, and performing, by the first client and the second client, message interaction between the first account and the second account based on the target media file if the difference satisfies the preset condition.

Acquiring the playing progress at which the second client plays the target media file and the playing progress at which the first client plays the target media file in the playing process of the second client and the first client may respectively correspond to acquiring played content of the target media file and a playing time point corresponding to the played content played by the first client and the second client. Then, the difference between the playing progress at which the second client plays the target media file and the playing progress at which the first client plays the target media file is calculated, to further determine, according to the difference, whether the playing progress at which the second client plays the target media file and the playing progress at which the first client plays the target media file are the same. In an ideal situation, when network conditions of the first client and the second client are relatively good, the playing progress at which the second client plays the target media file and the playing progress at which the first client plays the target media file are the same or substantially, and the difference between the playing progress at which the second client plays the target media file and the playing progress at which the first client plays the target media file is zero or approximately zero.

After the difference between the playing progress at which the second client plays the target media file and the playing progress at which the first client plays the target media file is calculated, whether the difference satisfies the preset condition is determined. Optionally, if the difference falls within a preset range, it is determined that the difference satisfies the preset condition, and it can be approximately considered that the playing progress at which the first client plays the target media file and the playing progress at which the second client plays the target media file are the same (or substantially the same), so as to enable the first client and the second client to perform message interaction between the first account and the second account based on the target media file.

As an optional implementation, in step S206, the performing, by the first client and the second client message interaction between the first account and the second account based on the target media file includes: sending, by the first client, a first message of the first account in the playing process based on the target media file to the second client, and receiving, by the first client, a second message of the second account for replying to the first message by means of the second client.

The first client acquires the first message of the first account in the playing process based on the target media file. Optionally, in the process of playing the target media file, the first account issues a first message based on played content of the target media file, or may also issue any opinion based on a playing time point of the target media file, to obtain the first message, and the content of the first message is not limited herein. The first client acquires the first message and sends the first message to the second client, where the second account replies to the first message by means of the second client, to obtain a second message. After the first client acquires the first message of the first account in the playing process based on the target media file, the first client sends the first message to the second client, the second client receives the first message, and the second target user corresponding to the second account may read the first message by means of the message interaction page of the second client. The second account replies to the first message by means of the second client, or may perform replying based on played content of the target media file, or may also reply any opinion, to obtain a second message. The second client acquires the second message and sends the second message to the first client.

After the first client sends the first message to the second client, the first client receives the second message sent by the second client for replying to the first message, and the first target user corresponding to the first account may read the second message by means of the message interaction page of the first client, so as to implement message interaction between the first account and the second account based on the target media file by the first client and the second client.

As an optional implementation, in step S206, the first message in the method for acquiring, by the first client, the first message of the first account in the playing process based on the target media file may be a first voice message or a first text message.

In the process of playing the target media file, the first account may issue the first voice message or the first text message based on the played content of the target media file, and the content of the first voice message or the first text message is not limited herein. After the first client acquires the first voice message or the first text message of the first account in the playing process based on the target media file, the first client sends the first voice message or the first text message to the second client, and the second client receives the first voice message or the first text message. The second account replies to the first voice message or the first text message by means of the second client, and may perform replying in a form of text or in a form of voice based on the played content of the target media file, to obtain a second voice message or a second text message. The second client sends the second voice message or the second text message to the first client.

It should be note that the first voice message and the first text message merely are example message types of the first message in the embodiments, but do not indicate that the first message in the embodiments only includes the first voice message and the first text message. Any form of a message of the first account in the playing process based on the target media file falls within the protection scope of the disclosure, and embodiments are not listed one by one herein.

It should be note that the second voice message and the second text message merely are example message types of the second message in the embodiments, but do not indicate that the second message in the embodiments only includes the second voice message and the second text message. Any form of a message of the second account for replying to the first message by means of the second client falls within the protection scope of the disclosure, and embodiments are not listed one by one herein.

As an optional embodiment, the sending, by the first client, the first message to the second client includes: uploading, by the first client, the first message to a third party storage server, where the third party storage server is configured to store the first message and send an upload result that the first message is successfully stored to the first client. The first client sends a message including a link address of the first message to the server. The message including the link address of the first message may also be stored to the server, where the message further includes information such as a protocol text or an ID identification used for message interaction. The server sends an alert message to the second client. The alert message is a message used for informing the second client of that the message including the link address of the first message can be received. The second client receives the alert message and sends, according to the alert message, a request command for requesting to acquire the link address of the first message. The server sends the link address of the first message to the second client according to the request command, the second client sends, according to the link address of the first message, a download request for downloading the first message to the third party storage server, and the third party storage server receives the download request, then downloads the first message, and sends the first message to the second client.

Optionally, the first client sends the first message to the server, and the server sends an alert message to the second client. The alert message is a message used for informing the second client of that the first message can be received. The second client receives the alert message and sends, according to the alert message, a request command for requesting to acquire the first message, and the server sends, according to the request command, the first message to the second client, so as to enable the second client to acquire the first message.

Optionally, the first client sends, according to a preset time, a report time and a playing offset time of the target media file to the server. The server determines, according to the report time and the playing offset time of the target media file, whether frame skip occurs in the playing process of the target media file. If the server determines, according to the report time and the playing offset time, that frame skip occurs in the playing process of the target media file, the server sends, to the second client, an adjusting instruction for adjusting a synchronous time and a synchronous frequency for synchronously playing the target media file by the first client and the second client. If the second client receives the adjusting instruction within a preset period of time, the second client adjusts the synchronous time and the synchronous frequency according to the adjusting instruction. If the second client does not receive the adjusting instruction within the preset period of time, the second client sends, to the server, a query instruction for querying a playing state of the target media file in the playing process, to obtain a query result, and adjusts the synchronous time and the synchronous frequency according to the query result.

The following describes the technical solution of the disclosure in combination with exemplary embodiments.

Figure 3:
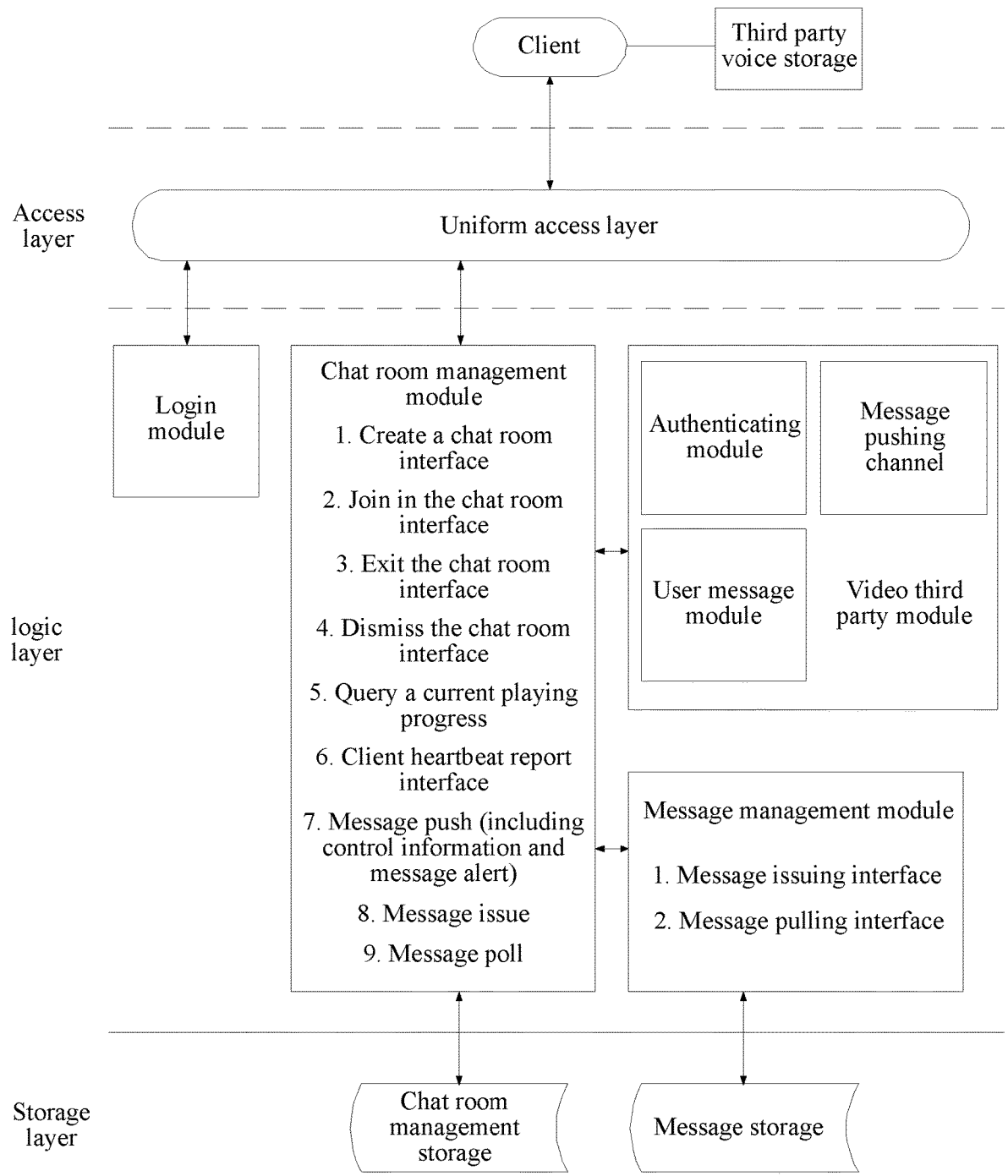
FIG. 3 is a schematic structural view of message transmission for a media file according to an exemplary embodiment.

FIG. 3 is a schematic structural view of message transmission for a media file according to an exemplary embodiment.

As shown in FIG. 3, the structure of message transmission for a media file includes:

a client, connected to logic modules of a backend logic layer by means of a uniform access layer, where the client may pull a message from a third party voice storage, or may also store a message to the third party voice storage;

a login module, configured to perform login and logout operations of an account for logging in the client; and a chat room management module, configured to manage a live broadcast chat room, where for example, a chat room is created by means of a chat room creation interface of the chat room management module, the chat room including a message interaction page for message interaction, an account joins in by means of a chat room join-in interface, an account is logged out by means of a chat logout interface, and accounts are dismissed by means of a chat room dismiss interface, the chat room management module may further query a current playing progress of the target media file, may report a current playing state of the client by means of client heartbeat report interface, or may also be configured to push a message, including pushing a control message and an alert message, and the chat room management module may also be configured to issue a message and poll a message; and an authenticating module, configured to determine whether an account logging in the client satisfies a login condition;

a user message module, including an account and user information corresponding to the account such as image information and a nickname;

a message pushing channel, configured to push a message in a message interaction process;

a video third party module, the video third party module including the authenticating module, the user message module, and the message pushing channel;

a message management module, including a message issuing interface and a message pulling interface, where the message issuing interface is configured to issue a message and the message pulling interface is configured to pull a message, so as to implement message interaction and maintenance and storage of the message;

a chat room management storage, connected to the chat room management module, and adopting a Grocery storage, the Grocery storage is a non-relational database implemented inside a company and adopts whole memory storage; and a message storage, connected to the message management module, configured to storage the issued message and the pulled message, and adopting a Grocery storage.

According to an embodiment, the client is connected to the backend logic modules by means of the uniform access layer, login and logout operations of a user are implemented by means of the login module, the live chat room is managed and message maintenance and storage is implemented by means of the chat room management module, so as to implement the technical effect of performing message interaction in a process of playing a media file.

Figure 4:
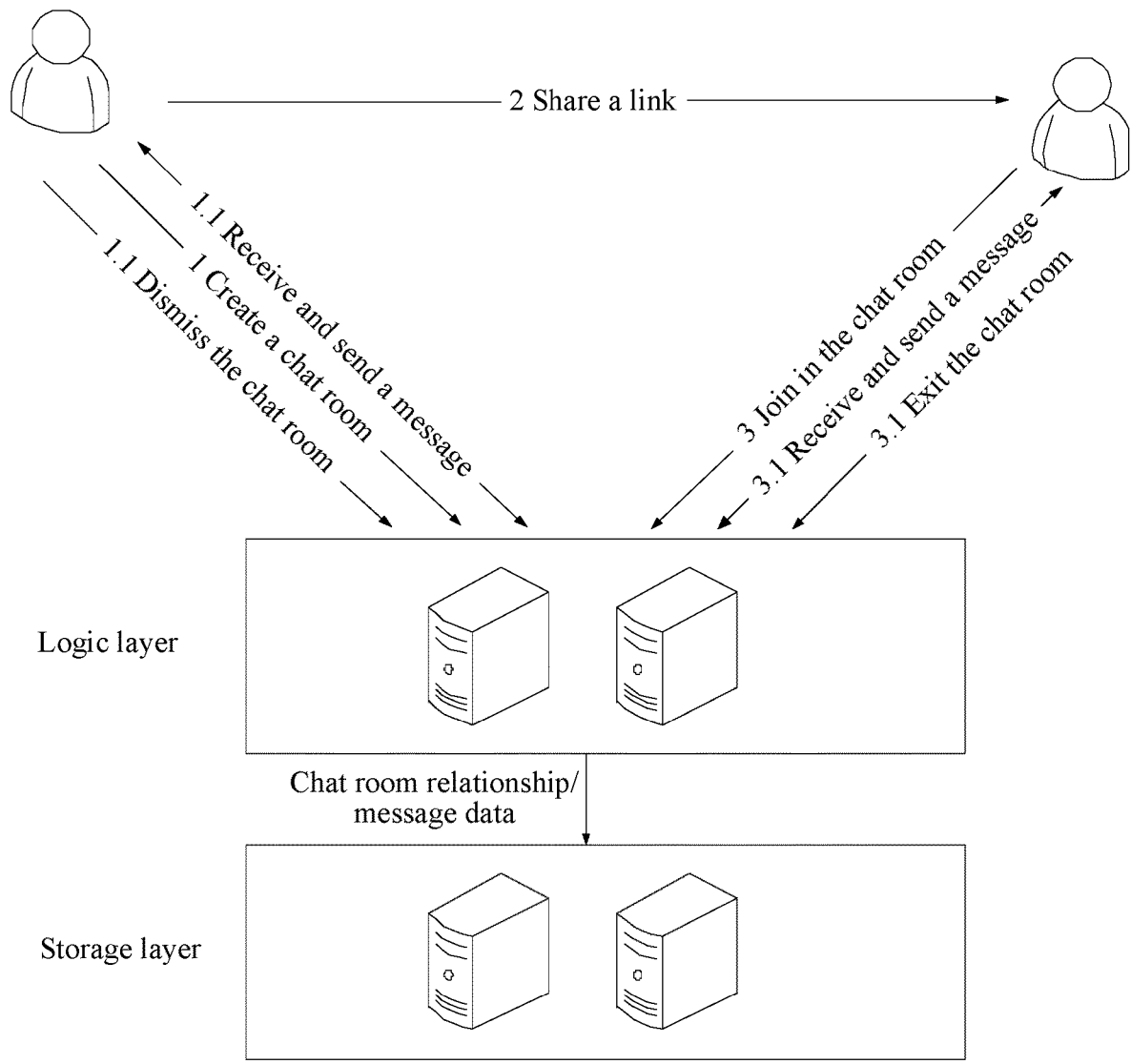
FIG. 4 is a schematic flow chart of a message transmission method for a media file according to an exemplary embodiment.

FIG. 4 is a schematic flow chart of a message transmission method for a media file according to an exemplary embodiment.

As shown in FIG. 4, the method includes the following steps:

Step 1: Create a chat room. In a logic layer, a server receives a creation result of creating a chat room by a first client. A first account corresponding to the first client which actively creates the chat room is determined as a host of the chat room. The step further includes:

Step 1.1: Receive and send a message and dismiss the chat room. The first client and the server receive and send a message therebetween. The server stores message data of received and sent messages. The chat room may also be dismissed by means of the first client, so as to log out an account which performs message interaction with the first account corresponding to the first client.

Step 2: Share a link. The first client shares a link of the chat room. That is, the first client shares a link of a target media file being currently viewed to the second client and determines a second account corresponding to a second client as a guest of the chat room.

Step 3: Join in the chat room. After the second client receives the link of the target media file, the second account corresponding to the second client joins in the chat room according to the link of the target media file. A relationship of performing message interaction between the first account and the second account is stored to the server. That is, the server stores the relationship of message interaction in the chat room. The step further includes:

Step 3.1: Receive and send a message and exit the chat room. The second client receives and sends a message from and to the first client by means of the server. Data of the received and sent messages is stored in the server. That is, in the storage layer, the server stores message data. The second client may also exit the chat room, so as to no longer perform message interaction with the first account. Optionally, if the first account logs out, all the second accounts log out.

In the embodiment, the first account creates a chat room by means of the first client and shares a link of the chat room by means of the first client, the second account may join in the chat room according to the link shared by the first account by means of the second client, and the first account performs message interaction by means of the first client with the second account by means of the second client, so as to implement a lifecycle of the message transmission method for a media file, and further implement the technical effect of performing message interaction in a process of playing a media file.

Figure 5:
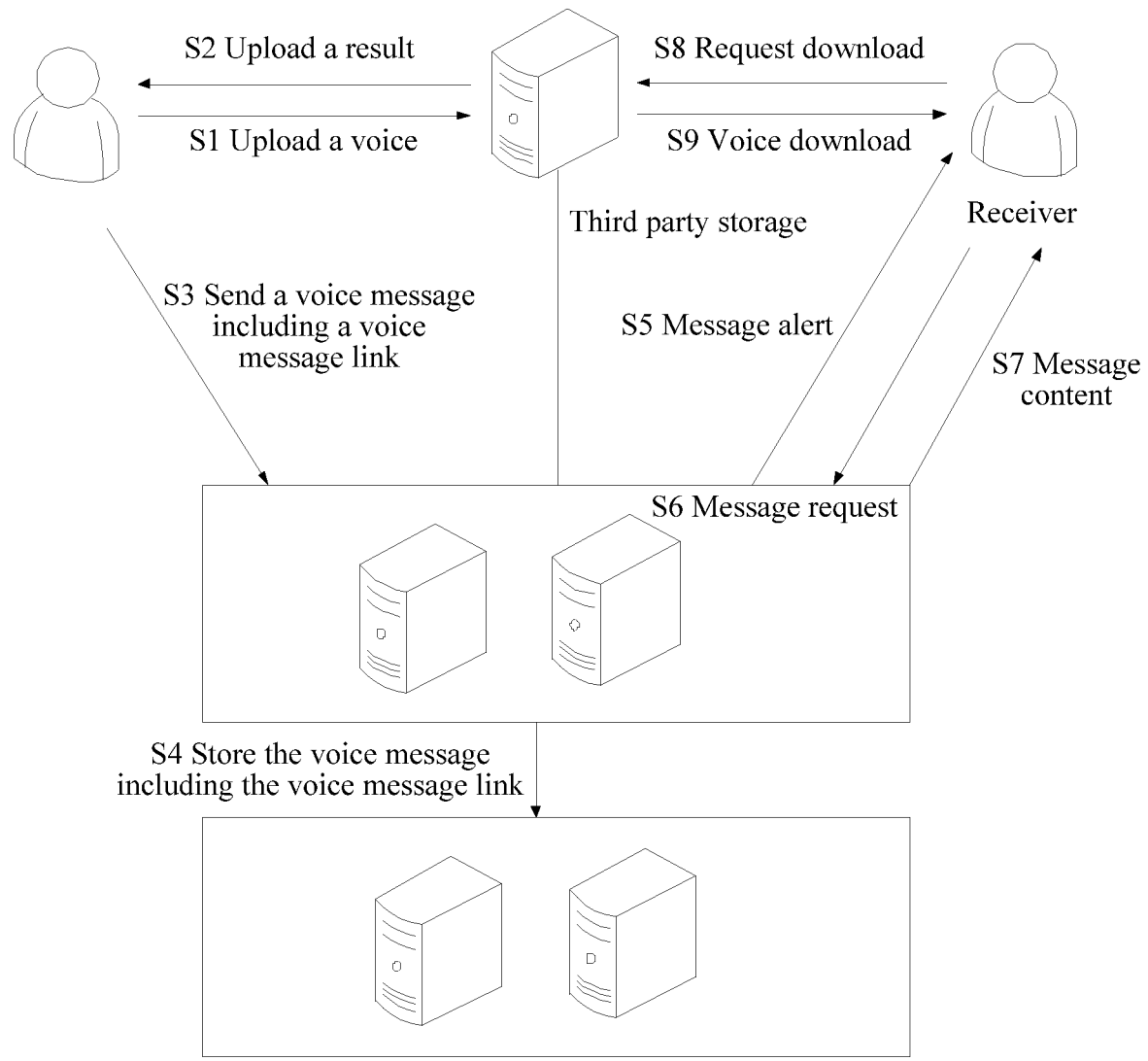
FIG. 5 is a schematic flow chart of a method for issuing a voice according to an exemplary embodiment.

FIG. 5 is a schematic flow chart of a method for issuing a voice according to an exemplary embodiment.

As shown in FIG. 5, the method includes the following steps:

Step S1: Upload a voice. A first client is a sender and uploads the voice to a third party for storage.

Step S2: Upload a result. A second client acquires the uploaded result successfully stored by the third party.

Step S3: Send a voice message including a voice message link. The voice message further includes information such as a protocol text or an ID identification used for message interaction.

Step S4: Store the voice message including the voice message link.

Step S5: Message alert. A server sends an alert message to the second client. The alert message is a message used for informing the second client of that the message including the voice message link can be received.

Step S6: Message request. The second client receives the alert message and sends, according to the alert message, a request command used for requesting to acquire the message including the voice message link.

Step S7: Message content. The server sends message content to the second client. The message content may include the voice message link.

Step S8: Request download. The second client sends, according to the voice message link, a download request for downloading a voice to a third party storage server.

Step S9: Voice download. The third party storage server receives the download request, then downloads the voice, and sends the voice to the second client.

In the embodiment, for issuing a voice message, a video backend regards the voice message as a common text message, stores an ID of a voice, and adds a Type field for indicating a message type. Uploading, downloading, and storage of a voice all depend on a third party backend.

Figure 6:
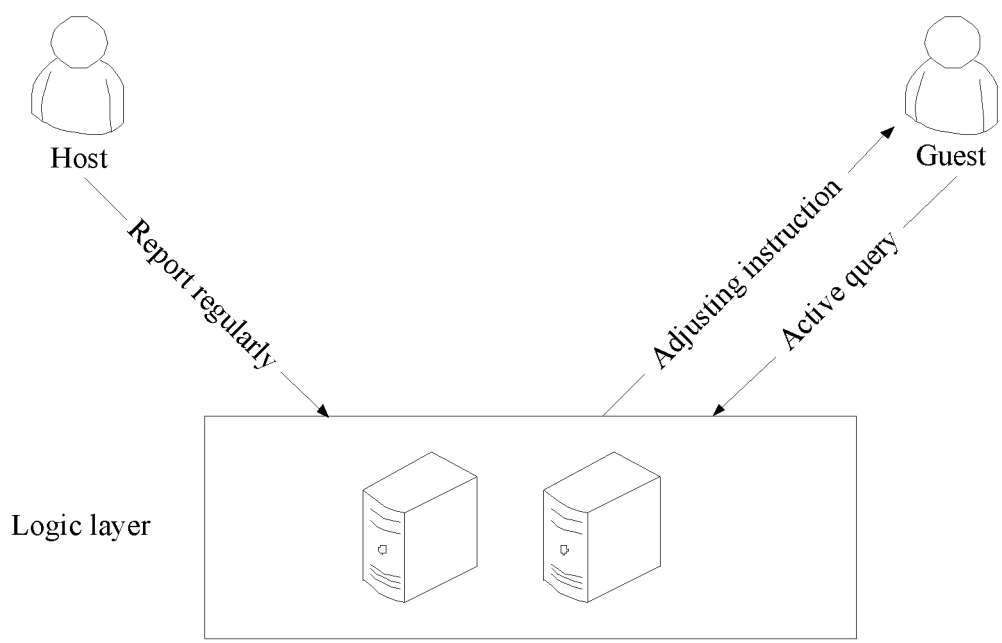
FIG. 6 is a schematic flow chart of a method for synchronizing playing progresses of a target media file according to an exemplary embodiment.

FIG. 6 is a schematic flow chart of a method for synchronizing playing progresses of a target media file according to an exemplary embodiment.

As shown in FIG. 6, a host reports a heartbeat. That is, a first client reports a state of playing a target media file by a first client (e.g., including a report time of the target media file and a playing offset time of the target media file) to a logic layer. A backend calculates, according to a heartbeat stored last time and the current heartbeat, whether frame skip occurs to the host state, and if it is found that frame skip occurs to the host state, delivers an adjusting instruction (e.g., simultaneously delivering: a. a maximum time allowing asynchronization; and b. an upper limit of adjusted frequency). If the adjusting instruction is not received within a period of time, active query of the playing state of the host may be performed. A terminal determines, according to the maximum time allowing asynchronization and the upper limit of adjusted frequency, whether to perform adjustment and synchronization, so as to achieve the purpose of synchronizing the playing progresses of the target media file.

Storage of interaction information in the embodiments primarily adopts Grocery. Data is stored by mainly adopts a key-value form (an optimistic lock of Grocery is adopted during concurrent writes of multiple progresses, to ensure consistency of data). For session basic information, a form in which a key: session ID and a value: session name+creator+creating time+session portrait+session brief+number of session members is adopted. For message basic information, a form in which a key: message ID, and a value: creator+message type+issuing time+message content+showing approach is adopted. For a message list index, a form in which a key: session ID, and value: message list [number of messages+ID of a currently earliest message+ID of a currently latest message+message index [message ID+issuer+issuing time+message type] is adopted. For a session list in which a user is, a form in which a key: user ID, and a value: session list [session ID+join-in time+user type+nickname+portrait] is adopted. For a session user list, a form in which a key: session ID, and a value: user list [user ID+user type+user join-in time+user portrait+user nickname] is adopted.

In the embodiment, according to the structure for message transmission for a media file, a lifecycle of a message transmission method for a media file, a method for synchronizing playing progresses of a target media file, and storage of interaction information, the technical effect of performing message interaction in a process of playing a media file is achieved, and further the technical problem that message interaction cannot be performed in a process of playing a media file in the related technology is resolved.

The application environment in the embodiment may refer to, for example but is not limited to, the application environment in the foregoing embodiment. The technical solution in the embodiment may be applied to a live chat room. A user creates a chat room belonging to a live broadcast in a process of viewing the network live broadcast, and invites other friends to enter the chat room to watch the video together and perform real-time chatting and interaction. A target user group includes users for which a cognitive relationship is established, and therefore the application scenarios may at least include the following: ① a pure acquaintance scenario, for example, families and lovers watching a live broadcast; ② a half-acquaintance scenario, for example, a fans group watching a live broadcast; and ③ a light-acquaintance scenario, for example, a web celebrity leading others to watch a program in a social media platform.

Figure 7:
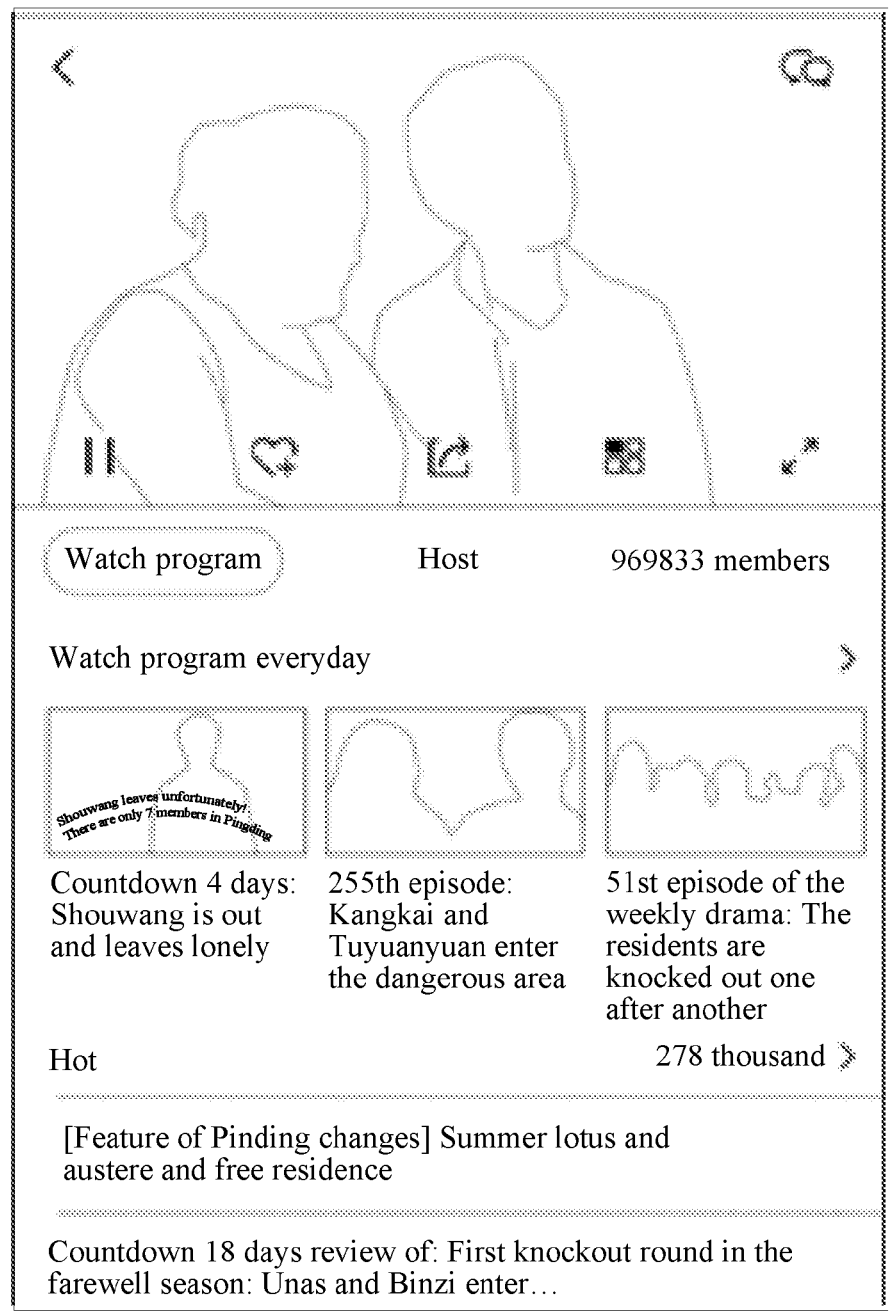
FIG. 7 is a schematic diagram of creating a chat room according to an exemplary embodiment.

FIG. 7 is a schematic diagram of creating a chat room according to an exemplary embodiment.

As shown in FIG. 7, a first account logs in a video client. A first target user may select a live program currently being played. A chat room based on the live broadcast can be created by clicking on a chat room creating button at an upper-right corner of a player. After finishing the chat room creating step, a chat room session mode is automatically entered.

Figure 8:
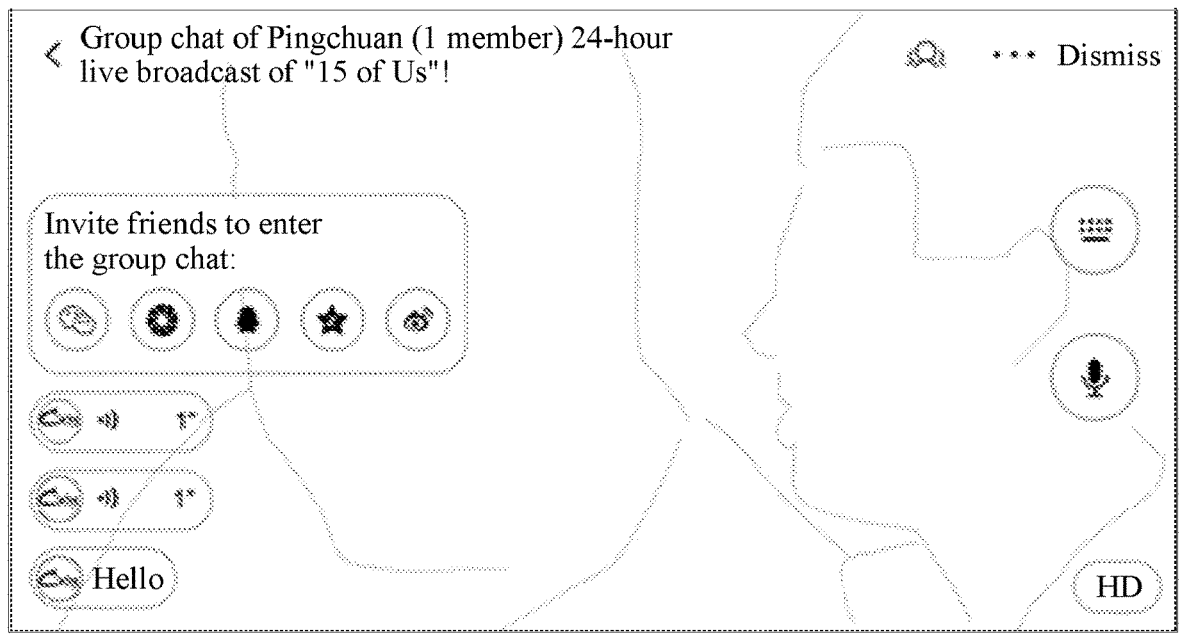
FIG. 8 is a schematic diagram of a chat room according to an exemplary embodiment.

FIG. 8 is a schematic diagram of a chat room according to an exemplary embodiment.

As shown in FIG. 8, after finishing the chat room creating step, a chat room session mode is automatically entered, and a chat room interface is entered. By clicking on a button of three small portraits at an upper-right corner in the figure, an interface of sharing a video file and adding an account to a list is entered. The first account may control a user corresponding to a currently added account by means of the first client, and has an authority of kicking out the added account from the chat room.

Figure 9:
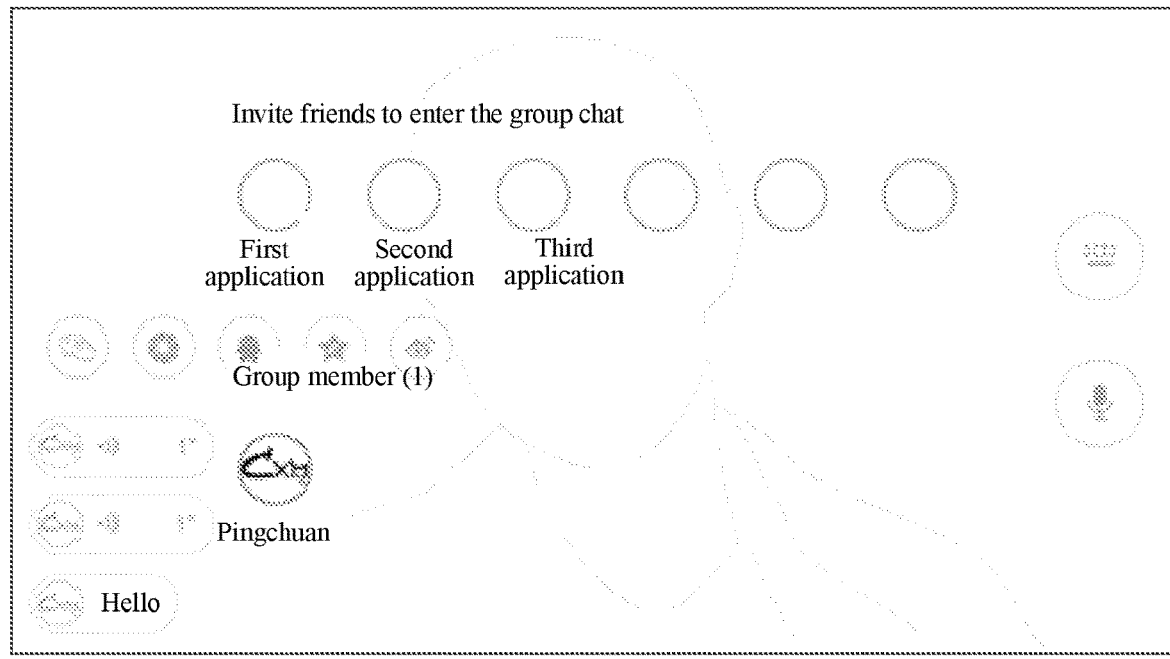
FIG. 9 is a schematic diagram of a chat room management interface according to an exemplary embodiment.

FIG. 9 is a schematic diagram of a chat room management interface according to an exemplary embodiment.

As shown in FIG. 9, a client enters a chat room management interface. The chat room management interface may acquire, by means of different applications, a second account which performs message interaction with a first account.

Figure 10:
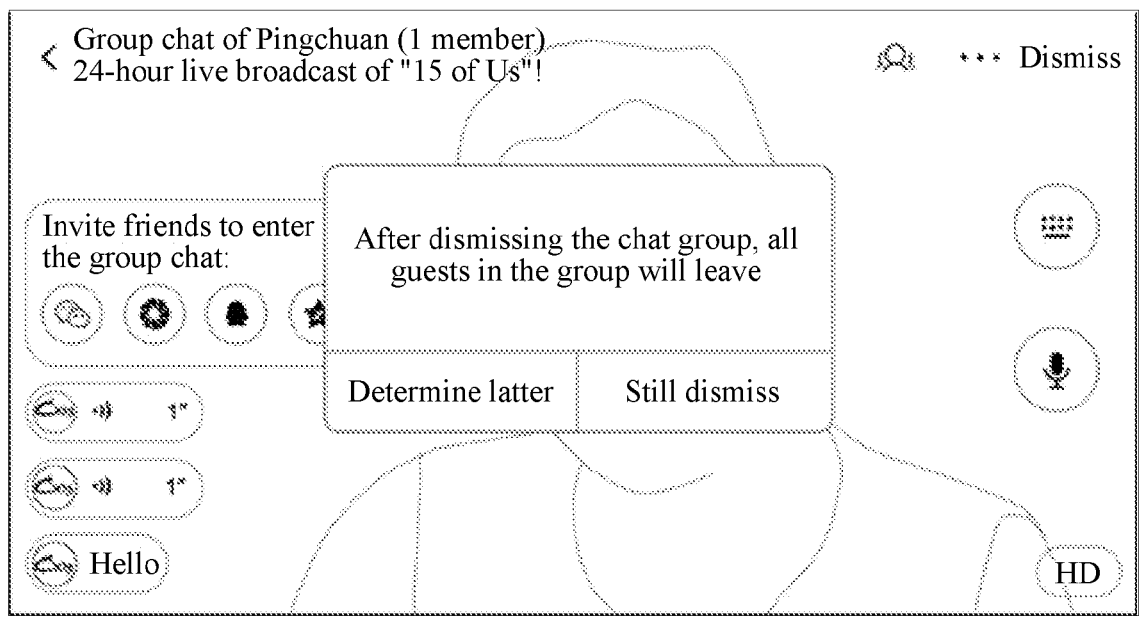
FIG. 10 is a schematic diagram of a chat room dismiss interface according to an exemplary embodiment.

FIG. 10 is a schematic diagram of a chat room dismiss interface according to an exemplary embodiment.

As shown in FIG. 10, in the chat room management interface, there is also a "Dismiss" button at an upper-right corner. If the button is clicked, all guests in the group leave automatically. When implementing the dismissing function, prompt information of "All guests in the group will leave after dismissing the group chatting", "Determine latter", and "Continue dismissing" is displayed, for selection by a user. If the user merely wants to temporarily leave the chat room mode instead of closing the chat room, there is a button at a lower-right corner of a main interface of the video client and the user may rapidly enter a previous chat room by clicking on the button.

Figure 11:
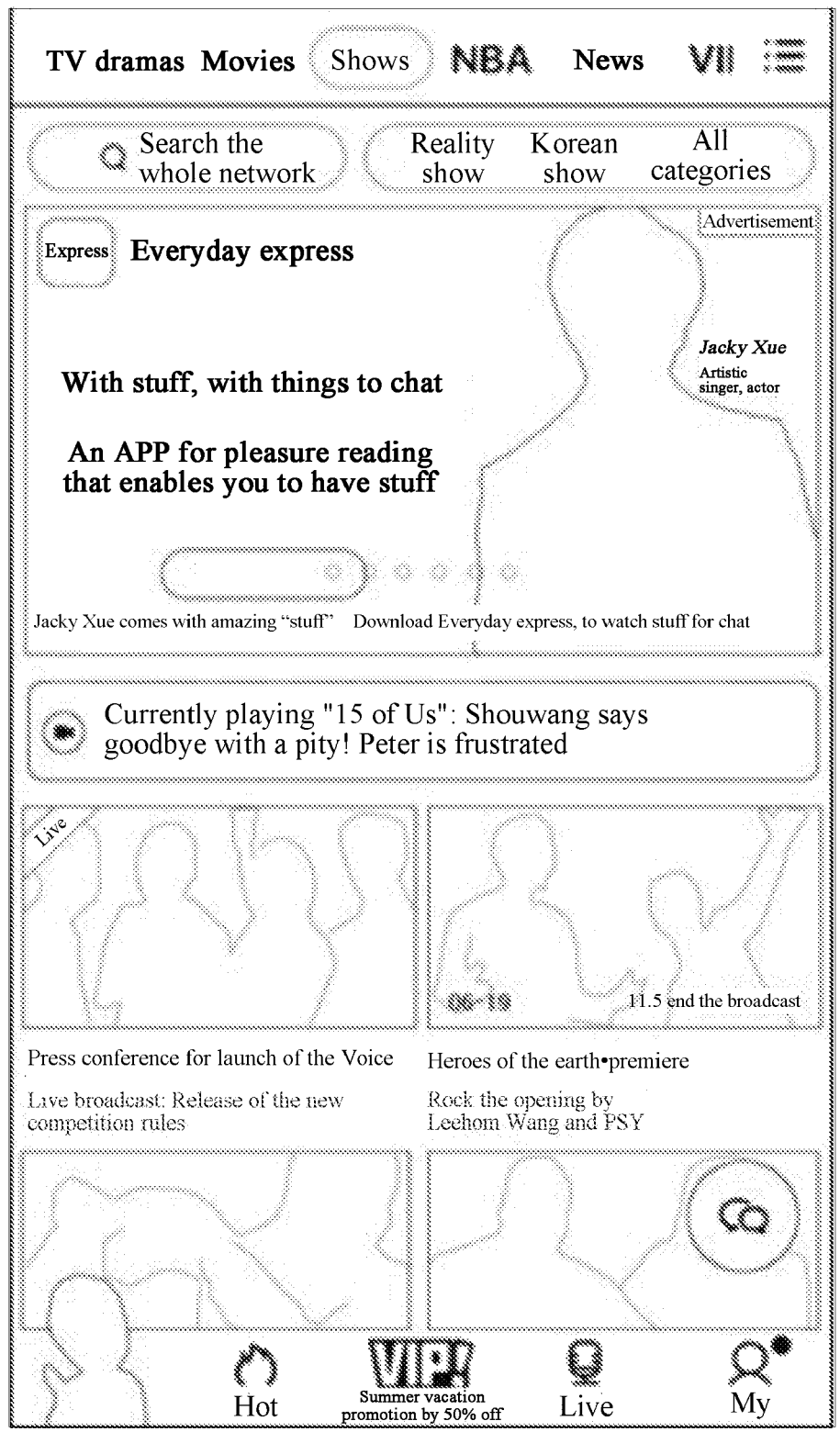
FIG. 11 is a schematic diagram of a chat room quick entry interface according to an exemplary embodiment.

FIG. 11 is a schematic diagram of a chat room quick entry interface according to an exemplary embodiment.

As shown in FIG. 11, by operating the interface, for example, by clicking on a session creating button at a lower-right corner, a chat scenario is entered rapidly. The session creating button may be the same as the chat room creating button in FIG. 7. Therefore, message interaction among different accounts in a process of playing a video file can be implemented.

It should be noted that the schematic diagram of the chat room and various chat room interfaces shown in FIGS. 7-11 are merely given as examples for illustrative purposes. Any other configurations can be employed to provide the chat room and various chat room interfaces according to the exemplary embodiments.

The video chat room mode provided in the exemplary embodiments may allow a user to create a private environment of watching a video together with friends on the basis of retaining the original watching experience, implement bidirectional real-time interaction and chatting in the watching process, increase interests of chatting, and also improve the cohesion of users to the app. More importantly, by the video chat room, a concept of creating a private group is established on the basis of watching a video, and users are allowed to break through gaps of time and space, to create a brand new common watching experience. On the basis of a group, the video chat room further has strong expandability. For example, a special tool may be added in the group to push paid watching or the like.

It should be noted that, for ease of description, the foregoing method embodiments are described as a series of action combinations. However, a person skilled in the art should understand that the disclosure is not limited to the described sequence of the actions, because some steps may be performed in another sequence or performed at the same time according to the disclosure. In addition, a person skilled in the art should also know that all the embodiments described in this specification are exemplary embodiments, and the related actions and modules are not necessarily required in the disclosure.

Through the descriptions of the preceding embodiments, a person skilled in the art may understand that the methods according to the foregoing embodiments may be implemented by hardware only or by software and a necessary universal hardware platform. However, in most cases, software and a corresponding universal hardware platform may be used. Based on such an understanding, the technical solutions of the disclosure essentially, or the part contributing to the prior art may be implemented in a form of a software product. The computer software product is stored in a storage medium (such as a ROM, a RAM, a magnetic disk, or an optical disc) and includes several instructions for instructing a terminal device (which may be a mobile phone, a computer, a server, a network device, or the like) to perform the methods described in the embodiments.

An exemplary embodiment further provides a message transmission apparatus for a media file for implementing the foregoing message transmission method for a media file. The message transmission apparatus for a media file includes a processor configured to execute a software program (or software program module) and a memory configured to store a software program of the software program.

Figure 12:
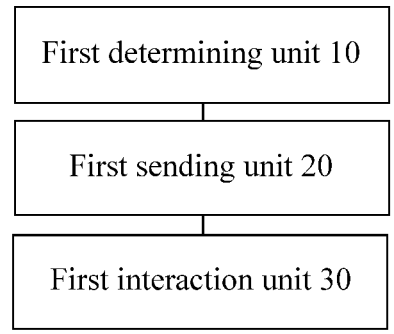
FIG. 12 is a schematic diagram of a message transmission apparatus for a media file according to an exemplary embodiment.

FIG. 12 is a schematic diagram of a message transmission apparatus for a media file according to an exemplary embodiment.

As shown in FIG. 12, the software program of the message transmission apparatus for a media file may include: a first determining unit 10, a first sending unit 20, and a first interaction unit 30.

The first determining unit 10 is configured to enable a first client to determine a second account which performs message interaction with a first account, the first account performing message interaction by means of the first client with the second account by means of a second client, and the second account including one or more accounts which perform message interaction with the first account; the first sending unit 20 is configured to enable the first client to send a preset link to the second client in a process in which the first client plays a target media file, the second client playing the target media file according to the preset link; and the first interaction unit 30 is configured to enable the first client and the second client to perform message interaction between the first account and the second account based on the target media file in a process in which the first client and the second client play the target media file, a message between the first account and the second account being displayed on preset pages of the first client and the second client.

It should be noted herein that the first determining unit 10, the first sending unit 20, and the first interaction unit 30 may be run in a terminal as a part of the apparatus, functions implemented by the units may be implemented by the processor in the terminal, and the terminal may be a terminal device such as a smartphone (such as an Android mobile phone or an iOS mobile phone), a tablet computer, a palmtop computer, a mobile Internet device (MID), or a PAD.

Optionally, the first determining unit 10 includes: a sending module and a determining module. The sending module is configured to enable the first client to send an invitation request, where the invitation request is used for requesting the second account to perform message interaction by means of the second client with the first account by means of the first client; and the determining module is configured to enable the first client to determine the second account according to a response result sent by the second client in response to the invitation request.

It should be noted herein that the sending module and the determining module may be run in a terminal as a part of the apparatus, functions implemented by the units may be implemented by the processor in the terminal, and the terminal may be a terminal device such as a smartphone (such as an Android mobile phone or an iOS mobile phone), a tablet computer, a palmtop computer, a mobile Internet device (MID), or a PAD.

Optionally, the software program of the message transmission apparatus for a media file further includes: a second determining unit, a second sending unit, and a second interaction unit. The second determining unit is configured to: after the determining, by a first client, a second account which performs message interaction with a first account, enable the first client to determine a third account which performs message interaction with the first account and the second account; the second sending unit is configured to:

after the first client sends the preset link to the second client, enable the first client to send the preset link to a third client, where the third client plays the target media file according to the preset link; and the second interaction unit is configured to enable the first client, the second client, and the third client to perform message interaction among the first account, the second account, and the third account based on the target media file, where a message among the first account, the second account, and the third account is displayed on preset pages of the first client, the second client, and the third client.

It should be noted herein that the second determining unit, the second sending unit, and the second interaction unit may be run in a terminal as a part of the apparatus, functions implemented by the units may be implemented by the processor in the terminal, and the terminal may be a terminal device such as a smartphone (such as an Android mobile phone or an iOS mobile phone), a tablet computer, a palmtop computer, a mobile Internet device (MID), or a PAD.

Optionally, the software program of the message transmission apparatus for a media file further includes: a third determining unit and a third interaction unit. The third determining unit is configured to: after the first client, the second client, and the third client to perform message interaction among the first account, the second account, and the third account based on the target media file, enable the first client to determine one or more dismissed accounts from the second account and the third account, and determine an account which performs message interaction with the first account, apart from the dismissed account, as a fourth account, where the dismissed account is an account which exists message interaction with the first account; and the third interaction unit is configured to enable the first client and a client corresponding to the fourth account to perform message interaction between the first account and the fourth account based on the target media file.

It should be noted herein that the third determining unit and the third interaction unit may be run in a terminal as a part of the apparatus, functions implemented by the units may be implemented by the processor in the terminal, and the terminal may be a terminal device such as a smartphone (such as an Android mobile phone or an iOS mobile phone), a tablet computer, a palmtop computer, a mobile Internet device (MID), or a PAD.

Optionally, the software program of the message transmission apparatus for a media file further includes: an acquiring unit and a fourth interaction unit. The acquiring unit is configured to: after the first client and the second client perform message interaction between the first account and the fourth account based on the target media file, enable the first client to acquire first instruction information, where the first instruction information is used for instructing to stop message interaction between the first account and the fourth account; and the fourth interaction unit is configured to enable the first client to stop message interaction between the first account and the second account according to the first instruction information.

It should be noted herein that the acquiring unit and the fourth interaction unit may be run in a terminal as a part of the apparatus, functions implemented by the units may be implemented by the processor in the terminal, and the terminal may be a terminal device such as a smartphone (such as an Android mobile phone or an iOS mobile phone), a tablet computer, a palmtop computer, a mobile Internet device (MID), or a PAD.

It should be noted that, the first determining unit 10 in the embodiment may be configured to perform step S202 in the embodiment, the first sending unit 20 in the embodiment may be configured to perform step S204 in the embodiment, and the first interaction unit 30 in the embodiment may be configured to perform step S206 in the embodiment.

It should be noted that the instances and application scenarios implemented by the units and modules and the corresponding steps are the same, but the disclosure is not limited to the content disclosed by the embodiments. It should be noted that the units and modules may be run in the hardware environment shown in FIG. 1 as a part of the apparatus, or may be implemented by software, or may also be implemented by hardware.

An exemplary embodiment further provides a terminal configured to implement the message transmission method for a media file. The terminal may be a computer terminal. The computer terminal may be any computer terminal device in a computer terminal group. Optionally, in this embodiment, the computer terminal may also be replaced with a terminal device such as a mobile terminal.

Optionally, in this embodiment, the foregoing computer terminal may be located in at least one of multiple network devices in a computer network.

Figure 13:
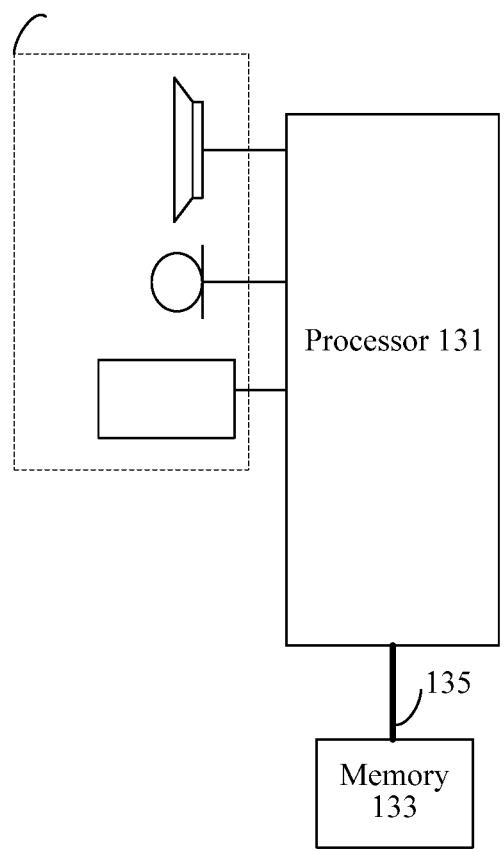
FIG. 13 is a structural block diagram of a terminal according to an exemplary embodiment.

FIG. 13 is a structural block diagram of a terminal according to an exemplary embodiment.

As shown in FIG. 13, the terminal may include: one or more (although only one is shown in the figure) processors 131, a memory 133, and a transmission apparatus 135. As shown in FIG. 13, the terminal may include an input/output device 137.

The memory 133 may be configured to store a software program and a module, for example, a program instruction/module corresponding to a message transmission method and apparatus for a media file in an exemplary embodiment, and the processor 131 performs various functional applications and data processing by running a software program and a module stored in the memory 133, that is, implementing the foregoing message transmission method for a media file. The memory 133 may include a high-speed random memory, and may also include a nonvolatile memory such as one or more magnetic storage devices, a flash memory, or another nonvolatile solid-state memory. In some embodiments, the memory 133 may further include memories remotely disposed relative to the processor 131, and these remote memories may be connected to the terminal through a network. Instances of the network include, for example but are not limited to, the Internet, an intranet, a local area network, a mobile communications network, and a combination thereof.

The transmission apparatus 135 is configured to receive or send data through a network, or may also be configured to perform data transmission between the processor and the memory. Specific examples of the foregoing network may include a wired network and a wireless network. In an example, the transmission apparatus 135 includes a network interface controller (NIC) that may be connected to another network device and a router by using a network cable, thereby communicating with the Internet or a local area network. In an example, the transmission apparatus 135 is a radio frequency (RF) module that is configured to communicate with the Internet in a wireless manner.

Specifically, the memory 133 is configured to store an application program.

The processor 131 may call an application stored in the memory 133 by means of the transmission apparatus 135, so as to execute program code of steps of the method of the optional or exemplary embodiments among the method embodiments, including:

determining, by a first client, a second account which performs message interaction with a first account, the first account performing message interaction by means of the first client with the second account by means of a second client, and the second account including one or more accounts which perform message interaction with the first account;

sending, by the first client, a preset link to the second client in a process in which the first client plays a target media file, the second client playing the target media file according to the preset link; and performing, by the first client and the second client, message interaction between the first account and the second account based on the target media file in a process in which the first client and the second client play the target media file, a message between the first account and the second account being displayed on preset pages of the first client and the second client.

The processor 131 is further configured to perform the following steps: the determining, by a first client, a second account which performs message interaction with a first account includes: sending, by the first client, an invitation request, where the invitation request is used for requesting the second account to perform message interaction by means of the second client with the first account by means of the first client; and determining, by the first client, the second account according to a response result sent by the second client in response to the invitation request.

The processor 131 is further configured to perform the following steps: after the determining, by a first client, a second account which performs message interaction with a first account, determining, by the first client, a third account which performs message interaction with the first account and the second account; after the sending, by the first client, a preset link to the second client, sending, by the first client, the preset link to a third client, where the third client plays the target media file according to the preset link, and the third account performs message interaction by means of the third client; and performing, by the first client, the second client, and the third client, message interaction among the first account, the second account, and the third account based on the target media file, where a message among the first account, the second account, and the third account is displayed on preset pages of the first client, the second client, and the third client.

The processor 131 is further configured to perform the following steps: after the performing, by the first client, the second client, and the third client, message interaction among the first account, the second account, and the third account based on the target media file, determining, by the first client, one or more dismissed accounts from the second account and the third account, and determining an account which performs message interaction with the first account, apart from the dismissed account, as a fourth account, where the dismissed account is an account which exits message interaction with the first account; and performing, by the first client and a client corresponding to the fourth account, message interaction between the first account and the fourth account based on the target media file.

The processor 131 is further configured to perform the following steps: after the performing, by the first client and the second client, message interaction between the first account and the second account based on the target media file, acquiring, by the first client, a first instruction information, where the first instruction information is used for instructing to stop message interaction between the first account and the second account; and stopping, by the first client, message interaction between the first account and the second account according to the first instruction information.

The processor 131 is further configured to perform the following steps: after the first client enables the second account to exit message interaction between the first account and the second account according to the first instruction information, acquiring, by the first client, a second instruction information, where the second instruction information is used for instructing to again stop message interaction between the first account and the second account; and again performing, by the first client, message interaction between the first account and the second account with the second client based on the target media file according to the second instruction information.

The processor 131 is further configured to perform the following steps: before the sending, by the first client, a preset link to the second client, acquiring, by the first client, a playing authority of playing the target media file; and playing, by the first client, the target media file after acquiring the playing authority. The sending, by the first client, a preset link to the second client includes: sending, by the first client, a preset link corresponding to a target media file configured with the playing authority to the second client, where the second client directly plays the target media file.

The processor 131 is further configured to perform the following steps: acquiring a playing progress at which the second client plays the target media file and a playing progress at which the first client plays the target media file; calculating a difference between the playing progress at which the second client plays the target media file and the playing progress at which the first client plays the target media file; and performing, by the first client and the second client, message interaction between the first account and the second account based on the target media file when the difference satisfies a preset condition.

The processor 131 is further configured to perform the following steps: acquiring, by the first client, a first message of the first account in a playing process based on the target media file; sending, by the first client, the first message to the second client, where the second account replies to the first message by means of the second client, to obtain a second message; and receiving, by the first client, the second message sent by the second client for replying to the first message.

The processor 131 is further configured to perform the following step: acquiring, by the first client, a first voice message or a first text message of the first account in the playing process based on the target media file. The sending, by the first client, the first message to the second client includes: sending, by the first client, the first voice message or the first text message to the second client, where the second account replies to the first voice message or the first text message by means of the second client, to obtain a second voice message or a second text message; and the receiving, by the first client, the second message includes: receiving, by the first client, the second voice message or the second text message sent by the second client for replying to the first voice message or the first text message.

The embodiments provide a solution of a message transmission method for a media file. By determining, by a first client, a second account which performs message interaction with a first account, the first account performing message interaction by means of the first client with the second account by means of a second client, and the second account including one or more accounts which perform message interaction with the first account, sending, by the first client, a preset link to the second client in a process in which the first client plays a target media file, the second client playing the target media file according to the preset link, and performing, by the first client and the second client, message interaction between the first account and the second account based on the target media file in a process in which the first client and the second client play the target media file, a message between the first account and the second account being displayed on preset pages of the first client and the second client, the purpose of performing message interaction between different accounts by means of clients based on a media file in a playing process of the media file is achieved, the technical effect of performing message interaction in a process of playing a media file is achieved, and further the technical problem that message interaction cannot be performed in a process of playing a media file in the related technology is resolved.

Optionally, for a specific example in this embodiment, refer to the examples described in the foregoing embodiments, and details are not described herein again in this embodiment.

Persons of ordinary skill in the art may understand that, the structure shown in FIG. 13 is only schematic. The terminal may be a terminal device such as a smartphone (such as an Android mobile phone or an iOS mobile phone), a tablet computer, a palmtop computer, a mobile Internet device (MID), or a PAD. FIG. 13 does not limit the structure of the foregoing electronic apparatus. For example, the terminal may further include more or less components (such as a network interface and a display apparatus) than those shown in FIG. 13, or has a configuration different from that shown in FIG. 13.

Persons of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An exemplary embodiment further provides a storage medium. Optionally, in this embodiment, the storage medium may store program code, the program code being used to execute steps in the program code for the message transmission method for a media file provided in the foregoing method embodiments.

Optionally, in this embodiment, the storage medium may be located in any computer terminal in a computer terminal group in a computer network, or be located in any mobile terminal in a mobile terminal group.

Optionally, in this embodiment, the storage medium is configured to store program code used to execute the following steps:

determining, by a first client, a second account which performs message interaction with a first account, the first account performing message interaction by means of the first client with the second account by means of a second client, and the second account including one or more accounts which perform message interaction with the first account;

sending, by the first client, a preset link to the second client in a process in which the first client plays a target media file, the second client playing the target media file according to the preset link; and performing, by the first client and the second client, message interaction between the first account and the second account based on the target media file in a process in which the first client and the second client play the target media file, a message between the first account and the second account being displayed on preset pages of the first client and the second client.

Optionally, the storage medium is further configured to store program code used to execute the following steps: after the determining, by a first client, a second account which performs message interaction with a first account, determining, by the first client, a third account which performs message interaction with the first account and the second account; after the sending, by the first client, a preset link to the second client, sending, by the first client, the preset link to a third client, where the third client plays the target media file according to the preset link, and the third account performs message interaction by means of the third client; and performing, by the first client, the second client, and the third client, message interaction among the first account, the second account, and the third account based on the target media file, where a message among the first account, the second account, and the third account is displayed on preset pages of the first client, the second client, and the third client.

Optionally, the storage medium is further configured to store program code used to execute the following steps: after the performing, by the first client, the second client, and the third client, message interaction among the first account, the second account, and the third account based on the target media file, determining, by the first client, one or more dismissed accounts from the second account and the third account, and determining an account which performs message interaction with the first account, apart from the dismissed account, as a fourth account, where the dismissed account is an account which exits message interaction with the first account; and performing, by the first client and a client corresponding to the fourth account, message interaction between the first account and the fourth account based on the target media file.

Optionally, the storage medium is further configured to store program code used to execute the following steps: after the performing, by the first client and the second client, message interaction between the first account and the second account based on the target media file, acquiring, by the first client, a first instruction information, where the first instruction information is used for instructing to stop message interaction between the first account and the second account; and stopping, by the first client, message interaction between the first account and the second account according to the first instruction information.

Optionally, the storage medium is further configured to store program code used to execute the following steps: after the first client enables the second account to exit message interaction between the first account and the second account according to the first instruction information, acquiring, by the first client, a second instruction information, where the second instruction information is used for instructing to again stop message interaction between the first account and the second account; and again performing, by the first client, message interaction between the first account and the second account with the second client based on the target media file according to the second instruction information.

Optionally, the storage medium is further configured to store program code used to execute the following steps: before the sending, by the first client, a preset link to the second client, acquiring, by the first client, a playing authority of playing the target media file; and playing, by the first client, the target media file after acquiring the playing authority. The sending, by the first client, a preset link to the second client includes: sending, by the first client, a preset link corresponding to a target media file configured with the playing authority to the second client, where the second client directly plays the target media file.

Optionally, the storage medium is further configured to store program code used to execute the following steps: acquiring a playing progress at which the second client plays the target media file and a playing progress at which the first client plays the target media file; calculating a difference between the playing progress at which the second client plays the target media file and the playing progress at which the first client plays the target media file; and performing, by the first client and the second client, message interaction between the first account and the second account based on the target media file when the difference satisfies a preset condition.

Optionally, the storage medium is further configured to store program code used to execute the following steps: acquiring, by the first client, a first message of the first account in a playing process based on the target media file; sending, by the first client, the first message to the second client, where the second account replies to the first message by means of the second client, to obtain a second message; and receiving, by the first client, the second message sent by the second client for replying to the first message.

Optionally, the storage medium is further configured to store program code used to execute the following steps: acquiring, by the first client, a first voice message or a first text message of the first account in the playing process based on the target media file. The sending, by the first client, the first message to the second client includes: sending, by the first client, the first voice message or the first text message to the second client, where the second account replies to the first voice message or the first text message by means of the second client, to obtain a second voice message or a second text message; and the receiving, by the first client, the second message includes: receiving, by the first client, the second voice message or the second text message sent by the second client for replying to the first voice message or the first text message.

Optionally, for a specific example in this embodiment, refer to the examples described in the foregoing embodiments, and details are not described herein again in this embodiment.

Optionally, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

The foregoing describes the message transmission method and apparatus for a media file and the storage medium of the disclosure in the embodiments with reference to the accompanying drawings. However, a person skilled in the art should understand that various modifications can further be made without departing from the content of the disclosure for the message transmission method and apparatus for a media file and the storage medium provided in the disclosure. Therefore, the protection scope of the disclosure should be subject to the content of the appended claims.

The sequence numbers of the preceding embodiments are merely for description purpose but do not indicate the preference or importance of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments.

In the foregoing embodiments, descriptions of the embodiments have different emphases, and as for parts that are not described in detail in one embodiment, reference can be made to the relevant description of the other embodiments.

In the various exemplary embodiments, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

The above descriptions are merely exemplary embodiments, and it should be noted that, a person of ordinary skill in the art may make various improvements and refinements without departing from the spirit of the disclosure. All such modifications and refinements should also be intended to be covered by the disclosure.

According to the exemplary embodiments, by determining, by a first client, a second account which performs message interaction (e.g., real time message interaction) with a first account, the first account performing message interaction by means of the first client with the second account by means of a second client, and the second account including one or more accounts which perform message interaction with the first account, sending, by the first client, a preset link to the second client in a process in which the first client plays a target media file, the second client playing the target media file according to the preset link, and performing, by the first client and the second client, message interaction between the first account and the second account based on the target media file in a process in which the first client and the second client play the target media file, a message between the first account and the second account being displayed on preset pages of the first client and the second client, the purpose of performing message interaction between different accounts by means of clients based on a media file in a playing process of the media file is achieved, the technical effect of performing message interaction in a process of playing a media file is achieved, and further the technical problem that message interaction cannot be performed in a process of playing a media file in the related technology is resolved.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component such as a processor or a circuit, and/or a software component that is executed by a hardware component such as a processor.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. A message transmission method, comprising:
   determining, by a processor that implements a first client, a second account which performs message interaction with a first account, the first client corresponding to the first account and the second account corresponding to a second client;
   transmitting to the second client, by the processor that implements the first client, a preset link that is usable for playing a target media file at the second client, the target media file being currently played at the first client; and
   transmitting and receiving, by the processor that implements the first client, a message between the first account and the second account based on the target media file being played at the first client and the second client, the message being displayed on a first preset page of the first client,
   wherein, during the transmitting and the receiving of the message between the first account and the second account, the first account regularly reports a heartbeat to a server, an adjustment of a synchronous time and a synchronous frequency at the second account being determined based on a comparison between a heartbeat stored last time in the server and a currently received heartbeat.

2. The method according to claim 1, wherein the determining comprises:
   transmitting, by the processor that implements the first client, an invitation request for requesting the second account to perform the message interaction with the first account; and
   determining, by the processor that implements the first client, the second account according to a response received in response to the invitation request.

3. The method according to claim 1, further comprising:
   determining, by the processor that implements the first client, a third account which performs the message interaction with the first account and the second account, the third account corresponding to a third client;
   transmitting, by the processor that implements the first client, the preset link to the third client, the preset link being usable for playing the target media file at the third client; and
   transmitting and receiving, by the processor that implements the first client, the message among the first account, the second account, and the third account based on the target media file being played at the first client, the second client, and the third client, wherein the message transmitted and received among the first account, the second account, and the third account is displayed on a second preset page of the first client.

4. The method according to claim 3, further comprising:
   determining, by the processor that implements the first client, one or more dismissed accounts from the second account and the third account, the message interaction being discontinued between the first account and the one or more dismissed accounts.

5. The method according to claim 1, further comprising:
   acquiring, by the processor that implements the first client, a first instruction to stop the message interaction between the first account and the second account; and
   stopping, by the processor that implements the first client, the message interaction between the first account and the second account according to the first instruction.

6. The method according to claim 5, further comprising:
   acquiring, by the processor that implements the first client, a second instruction to again perform the message interaction between the first account and the second account; and
   again performing, by the processor that implements the first client, the message interaction between the first account and the second account with the second client based on the target media file according to the second instruction.

7. The method according to claim 1, further comprising:
   acquiring, by the processor that implements the first client, a playing authority of playing the target media file;
   playing, by the processor that implements the first client, the target media file based on the playing authority; and
   transmitting, by the processor that implements the first client, the preset link corresponding to the target media file and the playing authority to the second client.

8. The method according to claim 1, wherein the performing comprises:
   acquiring a first playing progress at which the target media file is played at the second client and a second playing progress at which the target media file is played at the first client;
   obtaining a difference between the first playing progress and the second playing progress; and
   performing, by the processor that implements the first client, the message interaction between the first account and the second account based on the target media file and based on the difference satisfying a preset condition.

9. The method according to claim 1, wherein the performing comprises:
   acquiring, by the processor that implements the first client, a first message of the first account based on the target media file being played at the first client;
   transmitting, by the processor that implements the first client, the first message to the second client; and
   receiving, by the processor that implements the first client, a second message in response to the first message.

10. The method according to claim 9, wherein
the first message comprises at least one from among a first text voice message and a first text message, and the second message comprises at least one from among a second voice message and a second text message.

11. A message transmission apparatus, comprising:
   at least one memory configured to store computer program code; and
   at least one processor configured to access the at least one memory and operate according to the computer program code, the computer program code comprising:
   first determining code configured to cause the at least one processor to enable a first client, corresponding to a first account, to determine a second account which performs message interaction with the first account, the second account corresponding to a second client;
   first transmitting code configured to cause the at least one processor to enable the first client to transmit, to the second client, a preset link that is usable for playing a target media file at the second client, the target media file being currently played at the first client; and
   first interaction code configured to cause the at least one processor to enable the first client to transmit and receive a message between the first account and the second account based on the target media file being played at the first client and the second client, the message being displayed on a first preset page of the first client,
   wherein, during transmitting and the receiving of the message caused by the first interaction code, the first account regularly reports a heartbeat to a server, an adjustment of a synchronous time and a synchronous frequency at the second account being determined based on a comparison between a heartbeat stored last time in the server and a currently received heartbeat.

12. The apparatus according to claim 11, wherein the first determining code further causes the at least one processor to:
   enable the first client to transmit an invitation request for requesting the second account to perform the message interaction the first client; and
   enable the first client to determine the second account according to a response received in response to the invitation request.

13. The apparatus according to claim 11, wherein the computer program code further comprises:
   second determining code configured to cause the at least one processor to enable the first client to determine a third account which performs the message interaction with the first account and the second account, the third account corresponding to a third client;
   second transmitting code configured to cause the at least one processor to enable the first client to transmit the preset link to the third client, the preset link being usable for playing the target media file at the third client; and
   second interaction code configured to cause the at least one processor to enable the first client, to transmit and receive the message among the first account, the second account, and the third account based on the target media file being played at the first client, the second client, and the third client, wherein the message transmitted and received among the first account, the second account, and the third account is displayed on a second preset page of the first client.

14. The apparatus according to claim 13, wherein the computer program code further comprises:
   third determining code configured to cause the at least one processor to enable the first client to determine one or more dismissed accounts from the second account and the third account, the message interaction being discontinued between the first account and the one or more dismissed accounts.

15. The apparatus according to claim 11, wherein the computer program code further comprises:
   first acquiring code configured to cause the at least one processor to enable the first client to acquire a first instruction to stop the message interaction between the first account and the second account; and
   third interaction code configured to cause the at least one processor to enable the first client to stop the message interaction between the first account and the second account according to the first instruction.

16. The apparatus according to claim 15, wherein the computer program code further comprises:
   second acquiring code configured to cause the at least one processor to enable the first client to acquire a second instruction to again perform the message interaction between the first account and the second account; and
   fourth interaction code configured to cause the at least one processor to enable the first client to again perform the message interaction between the first account and the second account with the second client based on the target media file according to the second instruction.

17. The apparatus according to claim 11, wherein the target media file is currently played at the first client based on a playing authority, and
   the first transmitting code further causes the at least one processor to enable the first client to transmit, to the second client, the preset link corresponding to the target media file and the playing authority.

18. The apparatus according to claim 11, wherein the computer program code further comprises third acquiring code configured to cause the at least one processor to enable the first client to acquire a first playing progress at which the target media file is played at the second client and a second playing progress at which the target media file is played at the first client, and
   the first interaction code further causes the at least one processor to enable the first client to perform the message interaction between the first account and the second account based on the target media file and based on a difference between the first playing progress and the second playing progress satisfying a preset condition.

19. The apparatus according to claim 11, wherein the message transmitted and received between the first account and the second account comprises at least one from among a text voice message and a text message.

20. A non-transitory computer-readable recording medium having recorded thereon a program for executing a message transmission method, the message transmission method comprising:

determining, by a processor that implements a first client corresponding to a first account, a second account which performs message interaction with the first account, the second account corresponding to a second client;

transmitting to the second client, by the processor that implements the first client, a preset link that is usable for playing a target media file at the second client, the target media file being currently played at the first client; and transmitting and receiving, by the processor that implements the first client, a message between the first account and the second account based on the target media file being played at the first client and the second client, the message being displayed on a first preset page of the first client, wherein, during the transmitting and the receiving of the message between the first account and the second account, the first account regularly reports a heartbeat to a server, an adjustment of a synchronous time and a synchronous frequency at the second account being determined based on a comparison between a heartbeat stored last time and a currently received heartbeat.

\* \* \* \* \*